United States Patent Office 3,296,159
Patented Jan. 3, 1967

3,296,159
WASTE SULFITE LIQUOR ALIPHATIC ALDEHYDE REACTION PRODUCTS
Glenn K. Lissner, Los Altos, Calif., assignor to Diamond Alkali Company, Cleveland, Ohio, a corporation of Delaware
No Drawing. Filed Oct. 19, 1962, Ser. No. 231,815
7 Claims. (Cl. 260—17.5)

This invention relates to a new and improved thermosetting adhesive composition, intermediate therefor, and method especially adapted for advantageous use in the preparation of adhesive-bonded wood products such as particle board, hardboard, plywood, and the like.

Up to the present time, a large number of thermosetting synthetic resinous adhesives have been prepared and used in preparing various wood products such as particle board, hardboard, plywood and the like. In many respects, these prior adhesives have been satisfactory insofar as the preparation of a satisfactorily-bonded wood product is concerned. However, there is a continuing desire to improve and/or maintain a desired high adhesive quality in varying adhesively-bonded products of this type in the face of increasing manufacturing costs; at the same time, there also is an interest in producing a high quality particle board, hardboard, and/or plywood at a lower cost.

Toward this latter end, it has heretofore been proposed to use smaller amounts of known thermosetting synthetic resinous materials in the adhesives which, within certain limitations, does permit some reduction of the adhesive costs but in many instances also involves the practical difficulty of leading to a less satisfactory product. Another prior approach has been in the direction of providing new and different types of synthetic resinous adhesives. This approach has not yet proved to be the ideal solution because in many instances while advantageous synthetic resinous adhesives can be formulated, in large scale manufacturing of particle board, hardboard, plywood and the like, the commercial use of such adhesives often is not economically feasible or practicable.

Still another approach to the problem has been toward simply extending or diluting prior widely-used thermosetting adhesives, such as phenol-formaldehyde adhesives, or urea-formaldehyde adhesives with various fillers, diluents and the like. Again, within certain limitations, adhesive products can be obtained by this procedure which still meet certain cost and performance criteria. However, up to the time of this invention this approach also has failed to provide a completely satisfactory adhesive product and efforts have continued to improve and perfect suitable adhesives meeting the complex requirements of modern, large scale, particle board, hardboard, plywood and other adhesive-bonded wood product manufacture.

Accordingly, it is a principal object of the present invention to provide a new and improved adhesive component adduct and adhesive incorporating this adduct which is economically attractive and at the same time provides a novel and advantageous solution to the various difficult problems encountered in the large scale manufacture of bonded wood products such as plywood, hardboard and particle board.

Another object of the present invention is to provide a new and improved thermosetting adhesive adaptable to varied use in the bonded wood product field and especially suitable and advantageous for use in the large scale manufacture of particle board, hardboard and plywood.

A still further object of the invention is the provision of a novel adduct or reaction product which is adaptable for advantageous use in adhesive compositions.

Broadly, the present invention comprises the reaction product or adduct of an aldehyde and a lignin-sulfonate waste product and the use of this material as a reactive extender with an adhesive comprising the product obtained by combining the following ingredients in the indicated molar proportions:

| Ingredients | Molar Range | Preferred |
|---|---|---|
| Phenol | 4 to 6 | 5 |
| Aldehyde | 10 to 14 | 12 |
| Urea | 0 to 2 | 1 |

And mixing with these ingredients, preferably in a plural stage heating and mixing, a catalyzing amount, generally about one to five moles of an alkali, preferably an alkali metal hydroxide, especially sodium hydroxide, in concentrated aqueous form such as the typical 50% aqueous sodium hydroxide solution of commerce, hereinafter sometimes termed "blue liquor caustic."

In general, the adduct of this invention is prepared separately by combining an aliphatic aldehyde, preferably formaldehyde, and a lignin-sulfonate product such as that derived from sulfite process wood pulping, preferably an aqueous alkali or ammonium base waste sulfite liquor. The proportions of these ingredients can be varied somewhat but it generally is advantageous to use an excess of the lignin-sulfonate product. In practice, proportions typically can be varied from about one part by weight of formalin (37% aqueous formaldehyde) with about one part to fifteen parts by weight of the lignin-sulfonate product (50% solids) a ratio of about 1 to 10 preferably being used. The ingredients can be mixed at room temperature, with heating to as high as about 100° C. if desired, the resultant viscosity typically being about 4 to 8 poises. The pH generally is acidic, e.g., a pH of 3 to 4 is typical. If the adduct is to be incorporated in a phenol formaldehyde adhesive of this invention, it generally is desirable to raise its pH to the alkaline side, e.g., to a pH within the range from about 7 to 13, by addition of an alkali. This may be done advantageously by adding to the adduct in an initial mixing or pre-mixing step all or a portion of any alkali otherwise to be incorporated in the final adhesive. The adduct then is ready for incorporation into a phenol-formaldehyde adhesive of this invention.

In the initial mixing of the phenol-formaldehyde adhesive ingredients, as distinguished from the preparation of the adduct, sufficient of the alkali is added to obtain an initial pH of about 7.0 to 12.0, preferably 8.0 to 9.0. This mixture is then agitated and heated, typically and preferably in a so-called "first cook," at a temperature within the range from 60° to 100° C., preferably 90° to 95° C., for about two hours or until a viscosity within the range from 0.25 to 1.0 stoke, preferably 0.5 stoke, is obtained.

The mixture then is cooled to a temperature within the range from 50° to 70° C. and the balance of the alkali within the indicated molar proportions is added. Heating in what might be termed a "second cook" is then resumed at a temperature within the range from about 60° to 100° C., preferably 70° C. to obtain a viscosity within the range from 1.65 to 12.9 stokes. This resultant product is hereinafter termed the "base resin." The base resin viscosity generally should be within the range from 1 to 50 poises. Too low a viscosity leads to a low adhesive strength while too high a viscosity causes difficulty in application and short shelf life.

Referring more specifically to the practice of this invention, in most instances there is involved the combination of an adduct of this invention with a thermosetting adhesive base resin of this invention. A preferred thermosetting adhesive comprises a chemical combination of phenol and formaldehyde, usually but not necessarily with significant added amounts of urea, the entire mixture rendered alkaline and catalyzed by an alkali, notably and preferably an aqueous alkali metal hydroxide. In general, 0 to 2 moles of urea, 4 to 6 moles of phenol, 10 to 14 moles formaldehyde and 1 to 5 moles of alkali metal hydroxide are combined in a first cooking operation, it generally being preferred to add only part of the alkali metal hydroxide in this initial reaction to achieve the desired alkalinity. The temperature preferably is within the range from 90° to 95° C., the pH being adjusted by addition of sufficient aqueous sodium hydroxide to a value within the range from 7 to 12, preferably 8 to 9. The first cooking or reaction time generally takes 4 hours or less, although it will be appreciated, of course, that the time of cooking depends somewhat upon the type of reactor, reaction temperature, and the like. The viscosity of the adhesive obtained after the first cooking operation is generally fairly low, usually within the range from 0.25 to 1.0 stoke. The adhesive is then cooled to about 50 to 70° C., preferably to a temperature of about 60° C., and the balance of predetermined molar quantity of the alkali metal hydroxide is added. The adhesive mixture is again heated, typically to a temperature from 60° to 100° C., preferably at around 70° C., to obtain a higher viscosity within the range from 1.65 to 12.9 stokes. The resultant material, generally herein termed a "base resin," generally has considerable advantage as such and especially when combined with an adduct in the practice of this invention.

TABLE I

Illustrative of base resins embodying the invention are the following wherein the numerical values are pounds:

|  | A | B | C |
|---|---|---|---|
| Phenol (90%) | 1,516 | 5,990 | 2,100 |
| Formaldehyde (37% aq.) | 2,820 | 9,100 | 3,875 |
| Urea | 174 | 665 | 239 |
| Water | 760 | 3,560 | 25 |
| Sodium hydroxide (50% aq.) | 880 | 3,430 | 393 |

In order to prepare an adduct-phenol-formaldehyde adhesive embodying the invention, to the base resin is added at room temperature or at a slightly elevated temperature, e.g., 25° to 90° C. if desired, an aldehyde-lignin sulfonate adduct of this invention in addition to an alkali if necessary to provide in the resultant mixture a pH within the range from 9 to 14. In general, while the proportions of the waste sulfite liquor, caustic and base resin can be varied, especially advantageous results are obtained if substantially equal volumes of base resin and sulfite liquor are added to provide a product having a solids content of about 40 to 50% by weight, preferably 43 to 48%, and a viscosity of about 1.65 to 12.9 stokes.

Referring more particularly to the preparation of the adduct, in general, the waste sulfite product, preferably an aqueous lignin sulfonate waste liquor, such as the Orzan products of Crown Zellerbach Corporation AL–50 (ammonium liquor), or SL–50 (sodium liquor) is combined either alone, or in admixture, with an aldehyde, preferably formalin as 37% aqueous formaldehyde. The reaction temperature generally is within the range of 60° to 100° C., preferably 90° C., to obtain an adduct having the viscosity from about 1.65 to 50 stokes and a pH from about 2 to 4, the pH normally being on the acid side as indicated, although an acid pH is not essential.

In the combination of the adduct with a base resin of this invention, it is desirable to achieve a final adhesive composition containing 40 to 50 percent by weight of solids, and a viscosity within the range from about 1.65 to 12.9 stokes, a viscosity of 1.65 to 4 stokes being preferred for particle board and hardboard, while a viscosity of 4 to 12.9 stokes is preferred for plywood. The pH generally is maintained within the range from about 9 to 14, preferably about 9 to 12 when used as particle board and hardboard binders and about 12 to 14 for plywood manufacture. The proportions of the adduct and base resin are determined by a number of factors, including economics, cure rate desired, type of adhesive bond required or desired, and the nature of the product being prepared. In general, within certain limits, it is desired to use as high a proportion of the adduct as possible, but as a practical matter, it is found that it generally is advantageous to have the adduct comprise from 0 to 70% of the base resin adduct mixture.

In general, the compositions of this invention can be prepared by simply mixing together the various constituents in any suitable type of mixer with suitable heating and/or heat control means as indicated elsewhere in the specification largely because of certain heat-bodying steps and temperature control necessary to accommodate the exothermic heat of reaction. Thus, using suitable conditions to secure admixture with each other, the phenol-formaldehyde-urea base resin and the sulfite waste liquor adduct may be added to each other in any order and in any convenient manner.

The adhesives of this invention are relatively stable, have an adequate pot life, and may be applied directly in any of several applications. For example, they may be mixed with suitable fillers such as up to about 99% by weight of a filler, including materials such as wood flour, walnut shell flour, porous earths, refractory materials such as sand, and formed into molding compositions which may be made into various objects such as shell molds and molded wood products, in a conventional manner. The adhesives of this invention are also well suited and especially adapted for the manufacture of fiber board, resin-surfaced fiber board, plywood, particle board, hard board, and overlaid plywood.

In the preparation of hardboard, the resinous adhesive of this invention may be intimately mixed with about 70 to 99% by weight of a cellulose fiber, typically prepared by defiberizing wood or other lignocellulosic material in a conventional manner. The resulting composition may then be felted into a mat and pressed at any desired conventional pressure and elevated temperature conditions to form either insulation board or hardboard depending on conditions. The press conditions may, for example, be within the range from about 50 to 1000 lbs. per square inch at a temperature from about 100° C. up to about 220° C. for a press time within the range from about 1 to 20 minutes.

In making resin-surfaced fiber board from the adhesives of this invention, a base material comprising lignocellulosic fiber and a suitable resinous binder, which can be an adhesive of this invention if desired, first is formed into a mat by suitable conventional matting procedure. The mat then is sprayed or otherwise coated with about 3 to 50 lbs. by weight, on a 100% solids basis, of an adhesive of this invention per 1000 sq. ft. of mat area, the amount depending on the thickness and density of the mat. The mat may then be pressed under substantially the same conditions used before in forming fiber board and hardboard products, the resulting cured resin surface of the fiber board having a smooth, glossy surface, resistant to abrasion and various solvents and chemical reagents.

In the manufacture of plywood embodying adhesives of this invention a core veneer may be coated on both sides with the adhesive after which it is placed between two face veneers. The assembly then is introduced into a hot press and pressed at a temperature typically within the range of about 100° C. to about 180° C. for a period from about 2 to 20 minutes at a pressure from between about 150 p.s.i. to 250 p.s.i. to form a firmly-bonded, water-resistant plywood product.

In making so-called "overlaid" plywood, fibrous sheets such as paper napkin or toweling or other woven or nonwoven fibrous impregnating stock, may be impregnated with resinous compositions of this invention by dipping, spraying, or other suitable means and then placed on the surfaces of a plywood core, or on the outer surfaces of the face veneers of an uncured plywood assembly. The resulting structure is then placed between the platens of a press and hot pressed under the conditions used in the formation of plywood. The resulting product embodies a plywood base having a highly resistant, smooth resinous surface useful for many purposes.

In addition to the uses in the production of molding compounds, fiber board, particle board, hardboard, plywood, overlaid plywood and the like, the adhesives of this invention may advantageously be employed in such applications as impregnants of papers, fabrics, glass fibers, bonding compositions, abrasive grinding wheels, binders for particulate coal, resins for brake lining surface coatings, and the like.

In the preparation of the base resins of this invention, the phenol employed is not limited strictly to monohydroxy benzene but may be replaced wholly or in part by other phenols such as cresols, xylenols, di- and trihydroxy benzenes, and other substituted phenols, utilizing methods well known to those skilled in the art. Similarly, preparation of either base resin or adduct is not limited to the use of formaldehyde as such. Other aldehydes also can be used advantageously, alone or as mixtures, e.g., acetaldehyde, benzaldehyde, propionic aldehyde, butyl aldehyde, or the like.

The term "alkali" as used in the specification and claims is intended to refer especially to alkali metal hydroxides, such as sodium hydroxide, potassium hydroxide, lithium hydroxide, rubidium hydroxide or cesium hydroxide. In addition, alkaline earth hydroxides such as magnesium hydroxide, calcium hydroxide, barium hydroxide, also can be used. However, sodium hydroxide is preferred because of its availability and lower cost. In many applications, an especially advantageous form of an alkali metal hydroxide is a commercially available, 50% aqueous solution of sodium hydroxide, often herein termed "blue liquor caustic."

The expressions "lignin-sulfonate waste sulfite product" and "lignin-sulfonate product" as used in the specification and claims are intended to refer to the alkali-soluble, sulfonate residue waste product normally obtained as a by-product from the sulfite pulping of wood or other lignocellulosic plants by calcium, ammonium, magnesium or sodium base cooking liquors. During the pulping process, wood chips, or other comminuted fibrous raw materials, are cooked under pressure with a liquor containing essentially calcium, ammonium, magnesium or sodium bisulfite, sulphur dioxide and water. This liquor dissolves the lignin to a greater or lesser degree as well as the sugars and other water soluble constituents originally present in the lignocellulosic raw material. The resulting spent liquor is then separated from the pulp. Although the composition of this liquor is somewhat variable, depending upon the cooking conditions and the fibrous material use, its content of lignin sulfonates ranges generally between about 40% and about 90% by weight, typically 58% (dry basis), while the amount of sugars may range from about 10% to about 40% by weight, typically 15%, on a dry basis.

A typical liquor resulting from the pulping of western hemlock using the ammonium base sulfite process, contains about 11% solids having the composition shown in Table A wherein the miscellaneous constituents comprise wood extractives, waxes, fatty acids, sterols and the like. The composition shown in Table A comprises essentially ammonium lignin sulfonate.

TABLE A

| | Total solids, percentage by weight |
|---|---|
| Ammonium lignin sulfonates | 58 |
| Reducing sugars as glucose | 17 |
| Miscellaneous | 25 |

Illustrative of lignin-sulfonate sulfite waste products of this type are ammonium base sulfite spent liquors produced and sold by Crown Zellerbach Corporation under the trademark "Orzan" in liquid form in a wide range of concentrations, as well as in the form of dry powders. Sulfite spent liquors having other bases, such as calcium, magnesium or sodium, and composed principally of the lignin sulfonate salts of such metals, are equally suitable for carrying out the objects of this invention, although the ammonium base materials are preferred.

Although sulfite spent liquor is usually acidic in character as formed, it may be neutralized with an alkali, such as sodium hydroxide, or alkalized to a pH value higher than 7.0, if desired. Such neutralized or alkalized liquor is suitable for use in this invention. In general, it is preferred to have the pH of this material high enough to prevent insolubilization of the phenolic adhesive with which it is to be mixed.

Illustrative of specific acceptable commercially available materials of this type is Orzan AL–50, principally an aqueous solution of ammonium lignin sulfonate and wood sugars, containing 50% solids. A corresponding acceptable sodium base product is Orzan SL–50 also containing 50% solids.

While the precise structure of the lignin sulfonic acids is not known, evidence indicates that they are repeating unit polymers of an average molecular weight of about 10,000 to 40,000. The repeating unit is believed to have the general structure of guaiacyl propane

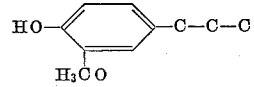

In order that those skilled in the art may more completely understand the present invention and the preferred methods by which the same may be carried into effect, the following specific examples are offered:

*Example 1*

In a glass reactor are combined 1000 g. Orzan AL–50 and 120 g. of a 37% aqueous solution of formaldehyde. The material is heated with agitation at 65° C. for 6 hours. The viscosity of the resultant product (48.5% solids) is 3.5 poises and the pH of the adduct is 3.1. This adduct is suitable for use as such or the preparation of adhesives of this invention by reactive extension of the herein disclosed phenol-formaldehyde-urea compositions.

*Example 2*

Using a glass reactor, 1000 g. of Orzan AL–50 and 120 g. of a 37% aqueous solution of formaldehyde are combined at room temperature with 70 g. of a 50% aqueous sodium hydroxide. The resultant alkaline mixture is agitated and heated at 65° C. for 5½ hours. The viscosity of the resultant adduct (48.6% solids) is 2.6 poises and the pH is 7.8. This adduct, having a higher pH than the adduct of Example 1 can be used in the same manner.

*Example 3*

Following the procedure of Example 1, an experiment is conducted using 1000 g. amounts of Orzan AL–50 and reacting each, respectively, separately with 90 grams and 60 grams of 37% aqueous solution of formaldehyde. In each instance, the materials are mixed at room temperature.

ADDUCT COMPOSITIONS

| | I | II |
|---|---|---|
| Orzan AL–50, g | 1,000 | 1,000 |
| Formalin, g | 90 | 60 |
| Solids Content, percent | 48.9 | 49.2 |
| pH, percent | 4.2 | 4.4 |
| Viscosity (poise), percent | 1.76 | 2.40 |

*Example 4*

To illustrate the use of higher reaction temperatures, an adduct is prepared by heating at 95° C. for two hours with continuous agitation 3000 g. of Orzan AL–50 and 360 g. of a 37% aqueous solution of formaldehyde. The resultant adduct viscosity is 31.2 poises and the pH is 3.5.

*Example 5*

Into a jacketed, 60 gallon, stainless steel, reaction kettle are charged 298 lbs. of Orzan AL–50 and 35.7 lbs. of 37% formalin. This mixture is agitated and heated at a temperature varying from 50° to 65° C. for 13¾ hours at a pH varying from 2.5 to 3.5 the viscosity increasing from 1.20 poises to 6.00 poises during this period. To 318.5 lbs. of adduct was added 65 lbs. of water and 24.5 lbs. of blue liquor caustic. The resultant adduct pH is 10.3 and the viscosity is .40 poises.

*Example 6*

To illustrate preparation of a complete wood bonding adhesive, there is first prepared an adduct of the invention having a pH of 3 to 4, by combining 214.3 lbs. of Orzan AL–50 and 25.7 lbs. of a 37% aqueous solution of formaldehyde following the precedures of Example 1. This adduct mixture is combined with 50 lbs. of water and 18 lbs. of 50% aqueous sodium hydroxide. The resulting alkaline adduct is then combined with 1740 lbs. of a urea-phenol-formaldehyde base resin prepared by separately combining in a reactor 5990 lbs. of 90% phenol, 9100 lbs. of 37% aqueous formaldehyde, 665 lbs. of urea, 3560 lbs. of water and 105 lbs. of 50% aqueous sodium hydroxide, the molar ratio of phenol to formaldehyde to urea 1.00:1.95:0.19. The pH of the initial reaction mixture is within the range from 8.5 to 9.0. Over a period of 4 hrs. the temperature is raised to 70° C. The reaction mixture is then cooled to 50° C. and the remainder of the 3430 lbs. of blue liquor caustic is added with continued cooling. The temperature is then raised to 90° C., the material being heat-bodied to a viscosity of .85 to 1.00 stoke, cooled to 80° C., and then heat-bodied to a viscosity of 4.7 to 5.0 stokes, the total time of heating being approximately 16 hrs. Typical viscosity of the base resin thus prepared is 4.7 to 5.5 stokes. Specific gravity is 1.190±.01 and its pH is within the range from 12 to 14, while its refractive index at 25° C. is 1.450±.01. When 1740 lbs. of this phenolic base resin is combined with the adduct, the final adhesive viscosity is within the range from 4.00 to 8.00 poises and the pH is 12 to 12.6.

The adhesive as prepared is suitable for use in the preparation of plywood. Using a similar procedure but reducing the caustic content so that the final pH is in the range of 9–12 an adhesive suitable for particle board or hardboard applications may be prepared. The viscosity can range from 1.65 to 12.9 stokes. In general, for particle board and hardboard, a viscosity of 1.65 to 4.0 stokes is preferred; while a viscosity from 4 to 12.9 stokes is preferred for plywood.

*Example 7*

To illustrate the usefulness of the resin of this invention in the manufacture of plywood adhesive, the following are prepared based on the following compositions.

Adhesive A—Base resin of Example 6.
Adhesive B—Base resin/adduct combination of Example 6.
Adhesive C—Base resin of Example 6 (870 parts) combined with the adduct of Example 5 (154 parts).
Adhesive D—Example 3 Composition I.
Adhesive E—Example 3 composition II.
Adhesive F—Base resin of Example 6+120 parts of the adduct of Example 4+25 g. water+9 g. 50% sodium hydroxide.

With each resin, glue mixes are prepared by combining 225 parts water, 120 parts of a filler consisting of the powdered residue from the hydrolysis of oat hulls, corn cobs and the like to produce furfural and commonly known as "Furafil 100," 45 parts of 50% sodium hydroxide and 25 parts of soda ash. After about 20 minutes mixing time, during which the filler is swelled and partially digested by the caustic, 750 parts of resin are added and the adhesive mixed an additional few minutes.

Eight 13/16″—5 ply Douglas fir plywood panels are glued with each adhesive using conventional techniques. Glue spreads are maintained at 63 lbs. per thousand square feet of double glue line. The panels are hot pressed individually at 300° F. under a pressure of 175 p.s.i. Press times are varied from 7 to 6½ minutes and assembly time from 5 to 22 minutes as indicated in the following table of results.

Standard specimens cut from each panel were subjected to the standard Douglas Fir Plywood Association two cycle boil test for exterior plywood. Average percent wood failure (percent WF) and breaking strength (p.s.i.) for each condition is given in Table II:

TABLE II

| Press Time, min. | Assembly Time, min. | Adhesive A | | Adhesive B | | Adhesive C | | Adhesive D | | Adhesive E | | Adhesive F | |
|---|---|---|---|---|---|---|---|---|---|---|---|---|---|
| | | Percent WF | p.s.i. | Percent WF | p.s.i. | Percent WF | p.s.i. | Percent WF | p.s.i. | Percent WF | p.s.i. | Percent WF | p.s.i. WF |
| 7 | 5 | 96 | 140 | 98 | 123 | 96 | 283 | 86 | 179 | 95 | 205 | 96 | 219 |
| | 22 | 93 | 195 | 96 | 112 | 96 | 213 | 96 | 189 | 94 | 211 | 95 | 206 |
| 6½ | 5 | 94 | 203 | 89 | 126 | 92 | 218 | 87 | 330 | 93 | 208 | 93 | 239 |
| | 22 | 96 | 176 | 96 | 120 | 96 | 210 | 92 | 119 | 91 | 210 | 91 | 249 |

*Example 8*

To illustrate the use of aldehydes other than formaldehyde in the preparation of adducts of this invention, there are combined 3500 g. of Orzan AL–50 with 227 g. of acetaldehyde. The resultant mixture is mixed at an initial temperature of 20° C. with an apparent exothermic reaction occurring with the acetaldehyde boiling, the reaction temperature then being 60° C., and subsequently increasing to 80° C., at which time, after about an hour and one-half, 262 g. of blue liquor caustic is added with separate additions of water in total amount of 724 g. The final pH is 10.6 and the viscosity is 1.6 poises. This adduct is usable in the same manner as the other adducts embodying formaldehyde. For example, 255 g. of the base resin B of Table I is combined with 45 g. of this acetaldehyde—Orzan adduct. The resulting mixture is agitated thoroughly at room temperature. The resultant pH is 12.7 and the viscosity is 8.0 poises. This adhesive is useful in the same manner as the formaldehyde-Orzan adduct adhesives.

*Example 9*

An adhesive suitable for preparation of particle board is prepared by mixing together 150 g. of base resin C of Table I and 150 g. of the acetaldehyde-Orzan AL–50 adduct of Example 8. The pH of the mixture was 9.9. To this mixture is added 7.5 g. of blue liquor caustic raising the pH to 10.3. The resulting viscosity is 3.4 poises.

*Example 10*

The procedure of Example 9 is repeated using 150 g. of a formaldehyde-Orzan AL–50 adduct of Example 1.

The pH is 9.7. Addition of 6 g. of blue liquor caustic increased the pH to 10.3. The resulting viscosity was 5 poises.

Example 11

To 200 g. of an adduct prepared by combining 1000 g. Orzan AL-50 and 120 g. of formalin with heating at 65° C. for about 22 hours, is added 35 ml. of water to obtain a 45.5% solids adduct. This material is then combined with 200 g. of a phenolic adhesive obtained by combining 1290 g. of phenol and 100 g. blue liquor caustic in a 4 liter resin kettle, and adding dropwise to the phenol-caustic mixture 2030 g. of formalin with continuous agitation over a period of 2½ hours. No urea is added and the mixture is heat bodied at 68° C. to a viscosity of 2.0 poises. Non-volatile—50.5%; pH—9.5. The adduct-phenolic adhesive mixture is stirred together at room temperature.

Example 12

Particle boards are prepared using the resin of Examples 9, 10 and 11 and base resin C of Table II. In each case, Douglas fir wood particles are sprayed with 4.5% resin solids based on the dry weight of the wood, formed into a 14" x 14" mat and hot-pressed at 350° F. under an initial pressure of 300 p.s.i. to the ¾" thickness stops and thereafter at 180° p.s.i. for a total period of 14 minutes.

Specimens cut from each board are tested for modulus of rupture and additional specimens are subjected to the ASTM accelerated aging test for durability.

Results shown in the following table have been adjusted to a board density of 42 lbs./cu. ft.

|   | Example 9 | Example 10 | Example 11 | Base Resin C |
|---|---|---|---|---|
| MOR*, p.s.i. | 1,790 | 2,172 | 2,110 | 2,190 |
| Durability, percent Retention of MOR | | 46 | 22 | 25 |

*Modulus of rupture.

Example 13

The composition of Example 10 is dried at 65° C. and finely powdered. Particle boards prepared using 4.5% of this product added dry had an average MOR strength of 1970 p.s.i. and a durability of 17% retention.

Additional boards prepared by reconstituting the dried powder to its original solids content with water have an average MOR strength of 2245 p.s.i. and a durability of 38% retention.

It is to be understood that, although the invention has been described with specific reference to particular embodiments thereof, it is not to be so limited, since changes and alterations therein may be made which are within the full intended scope of this invention as defined by the appended claims.

What is claimed is:

1. An adduct of a waste sulfite liquor product obtained by chemically reacting an aliphatic aldehyde and a waste sulfite liquor at a temperature between room temperature and about 100° C.

2. The product obtained by mixing together and heating at a temperature within the range from about room temperature to about 100° C. 1 to 15 parts by weight of an ammonium base waste sulfite liquor and about 1 part of an aqueous aliphatic aldehyde.

3. The product of claim 2 wherein the aldehyde is formalin.

4. An aqueous adhesive comprising, in combination, a phenolic adhesive obtained by combining 4 to 6 moles of a phenol, 10 to 14 moles of an aldehyde, 0 to 2 moles of urea and 1 to 5 moles of an alkali, and an amount at least equal to said phenolic adhesive of an adduct prepared by combining an aliphatic aldehyde and a lignin sulfonate waste product.

5. An adhesive as in claim 4 wherein the proportions of the phenolic adhesive ingredients are as follows:

|  | Moles |
|---|---|
| Phenol | 5 |
| Aldehyde | 12 |
| Urea | 1 |
| Alkali | 1.25 |

6. An aqueous adhesive comprising the reaction product obtained by first combining the following ingredients in the indicated molar amounts:

| Phenol | 4–6 |
|---|---|
| Formaldehyde | 10–14 |
| Urea | 0–2 | and mixing with the said ingredients a catalyzing amount of an alkali, reacting the catalyzed mixture at an elevated temperature to obtain a product having a pH within the range from about 7 to 12 and a viscosity within the range from about 0.25 to 1.0 stoke, bodying this product to a viscosity within the range from 1.65 to 12.9 stokes, adding an alkaline, aqueous, lignin sulfonate containing waste sulfite liquor—aqueous aliphatic aldehyde adduct at a pH sufficient to preclude insolubilization of the phenolic adhesive to obtain a mixture having a pH within the range from 9.0 to 14.0 and regulating the solids content to obtain an alkaline, aqueous adhesive containing about 35 to 60% solids.

7. An adhesive composition comprising (A) a major amount of an aqueous alkaline urea-phenol-formaldehyde adhesive and (B) a minor amount of the product of claim 3 combined with aqueous alkali, said adhesive having a pH between 12 and 13 and a viscosity at 25° C. of 4 to 8 poises.

References Cited by the Examiner

UNITED STATES PATENTS

| 2,282,518 | 5/1942 | Hochwalt et al. | 260—17.5 |
| 2,891,918 | 6/1959 | Uschmann | 260—17.5 |
| 3,076,772 | 2/1963 | Christ | 260—17.5 |

WILLIAM H. SHORT, *Primary Examiner.*

JAMES A. SEIDLECK, *Examiner.*

J. NORRIS, *Assistant Examiner.*